United States Patent
Gorti et al.

(10) Patent No.: US 10,956,164 B2
(45) Date of Patent: Mar. 23, 2021

(54) GATING UPDATES TO BRANCH PREDICTORS TO REDUCE POLLUTION FROM INFREQUENTLY EXECUTED BRANCHES

(71) Applicant: International Business Machines Corporation, Armonk, NY (US)

(72) Inventors: Naga Gorti, Austin, TX (US); Edmund Joseph Gieske, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/201,132

(22) Filed: Nov. 27, 2018

(65) Prior Publication Data
US 2020/0167165 A1    May 28, 2020

(51) Int. Cl.
*G06F 9/38*    (2018.01)

(52) U.S. Cl.
CPC .................... *G06F 9/3848* (2013.01)

(58) Field of Classification Search
None
See application file for complete search history.

(56) References Cited

U.S. PATENT DOCUMENTS

| | | | |
|---|---|---|---|
| 5,978,909 A * | 11/1999 | Lempel | G06F 9/3804 712/240 |
| 6,151,672 A * | 11/2000 | Hunt | G06F 9/3846 712/233 |
| 6,947,831 B2 | 9/2005 | Van Nieuwstadt | |
| 7,711,938 B2 | 5/2010 | Wise et al. | |
| 8,694,471 B2 | 4/2014 | Danoyan | |
| 8,838,160 B2 | 9/2014 | Ericson et al. | |
| 9,513,909 B2 * | 12/2016 | Adiga | G06F 9/3806 |
| 2004/0225872 A1 * | 11/2004 | Bonanno | G06F 9/3848 712/239 |
| 2005/0210225 A1 * | 9/2005 | Morrow | G06F 9/3844 712/239 |
| 2009/0070569 A1 | 3/2009 | Nagao et al. | |
| 2010/0306515 A1 * | 12/2010 | Al-Otoom | G06F 9/3848 712/240 |
| 2012/0124349 A1 | 5/2012 | Jarvis et al. | |
| 2012/0233237 A1 | 9/2012 | Roa et al. | |
| 2015/0227374 A1 * | 8/2015 | Blasco | G06F 9/3806 712/240 |

(Continued)

*Primary Examiner* — Eric Coleman
(74) *Attorney, Agent, or Firm* — Cantor Colburn LLP; Bryan Bortnick (57) ABSTRACT

A computer system includes a processor configured to generate a prediction by a branch predictor that a branch instruction will be taken or not taken by consulting a current state of a state machine, the state machine having at least one taken state and at least one not taken state. The processor is also configured to return the prediction to a processing unit and detect a result that the branch instruction was actually taken or actually not taken. The processor is further configured to, based on the prediction being different than the result or based on the prediction being weak and consistent with the result, consult a probability value being a static value and/or a value based on a history of outcomes of previous branch instructions, and based on the probability value having a selected value or being within a selected range, update the state machine.

19 Claims, 5 Drawing Sheets

(56) References Cited

U.S. PATENT DOCUMENTS

2015/0363204 A1* 12/2015 Bonanno ............... G06F 9/3806
712/240
2016/0026470 A1 1/2016 Manoukian

* cited by examiner

GATING UPDATES TO BRANCH PREDICTORS TO REDUCE POLLUTION FROM INFREQUENTLY EXECUTED BRANCHES

BACKGROUND

The present disclosure relates generally to computer processing systems, and more specifically to gating updates to branch prediction structures.

An instruction pipeline in a computer processor improves instruction execution throughput by processing instructions using a number of pipeline stages, where multiple stages can act on different instructions of an instruction stream in parallel. A branch instruction in an instruction stream may result in a pipeline stall if the processor waits until the conditional branch instruction is resolved in an execution stage in the pipeline before fetching a next instruction in an instruction fetching stage for the pipeline. A branch predictor attempts to guess whether a branch instruction will be taken or not.

Typically, a branch predictor utilizes a plurality of state machines to facilitate predictions. In a typical branch instruction execution, the branch predictor inspects the state of a state machine indexed from the branch instruction address and optionally parts of current processor execution state, and generates a prediction based on the current state of the state machine. The branch predictor then detects when the outcome of the branch instruction is actually available, which includes information on whether the branch instruction was taken or not taken by the pipeline or other processing component. The branch predictor then updates the state machine to better track the branch instruction outcome so that it will be more correctly predicted when it is subsequently fetched. As multiple branch instructions can map to the same state machine, such branch instructions can affect the accuracy of predictions made based on that state machine if these branch instructions have different characteristics (e.g., occur with different frequencies or have different taken rates).

SUMMARY

According to one embodiment, a computer system for predicting an outcome of a branch instruction includes a memory and a processor operatively connected to the memory, the processor including a processing unit and a branch predictor. The processor is configured to identify an instruction retrieved from an instruction sequence by the processing unit and, based on the instruction being a branch instruction, generate a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction. The processor is also configured to return the prediction to the processing unit and detect an outcome of the branch instruction from the processing unit, the outcome including a result that the branch instruction was actually taken or actually not taken. The processor is further configured to, based on the prediction being different than the result or based on the prediction being weak and consistent with the result, consult a probability value, the probability value being at least one of a static value and a value based on a history of outcomes of previous branch instructions, and based on the probability value having a selected value or being within a selected range, update the state machine.

According to another embodiment, a method of predicting an outcome of a branch instruction includes identifying, by a branch predictor, an instruction retrieved from an instruction sequence by a processing unit, and based on the instruction being a branch instruction, generating a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction. The method also includes returning the prediction to the processing unit and detecting an outcome of the branch instruction from the processing unit, the outcome including a result that the branch instruction was actually taken or actually not taken. The method further includes, based on the prediction being different than the result or based on the prediction being weak and consistent with the result, consulting a probability value, the probability value being at least one of a static value and a value based on a history of outcomes of previous branch instructions, and based on the probability value having a selected value or being within a selected range, updating the state machine.

According to a further embodiment, a computer program product includes a computer readable storage medium having program instructions embodied therewith, the program instructions executable by a processing system to identify, by a branch predictor, an instruction retrieved from an instruction sequence by a processing unit, and based on the instruction being a branch instruction, generating a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction. The program instructions are also executable to return the prediction to the processing unit and detect an outcome of the branch instruction from the processing unit, the outcome including a result that the branch instruction was actually taken or actually not taken. The program instructions are also executable to consult a probability value based on the prediction being different than the result or based on the prediction being weak and consistent with the result, the probability value being at least one of a static value and a value based on a history of outcomes of previous branch instructions, and based on the probability value having a selected value or being within a selected range, update the state machine.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

The present disclosure and exemplary embodiments described herein provide methods and systems for gating updates to branch predictors. A branch predictor or branch prediction unit is operably connected to a processing unit that executes a sequence of instructions. When a branch instruction is encountered, the branch predictor predicts a result of the branch instruction (i.e., whether the branch instruction will be taken or not taken) based on the state of a state machine that is mapped to the branch instruction. In addition, the branch predictor can also optionally predict the target of the branch instruction.

In one embodiment, after the branch instruction is executed by the processing unit, the outcome of that execution is detected by the branch predictor. The outcome includes a result as to whether the branch instruction was actually taken or not taken by the processing unit. The branch predictor may perform an update to the state machine to better track the branch instruction based on the current execution outcome.

In one embodiment, the branch predictor is configured to probabilistically gate the update, i.e., determine based on a probability value whether to perform the update. The probability value can be a single number or value, a range of numbers or values, or other information that can be used by the branch predictor to gate the update probabilistically. The probability value may be based on information regarding the history of executions of previously executed branch instructions that mapped to the state machine. For example, the probability value can be determined using a random number generator and/or a counter. Whenever possible, the compiler can also generate hints that can be associated with the branch instruction and guide the update gating policy.

Embodiments described herein improve processing speed and reduce latency by countering pollution from branch instructions that are relatively rare or are one-off branches. In addition, the gating functions discussed herein can be accomplished without the need to add additional hardware or complexity that would otherwise compromise processing speed.

For example, embodiments described herein allow for restricting updates that can occur due to branch instructions that are one-off instructions or instructions that are infrequent (cold branches). This restriction reduces instances where a cold branch causes an update and prioritizes more frequently occurring branch instructions (hot branches). Thus, if a state machine is mapped to both cold branches and hot branches, updates from cold branches are reduced or eliminated, so that the current state of the state machine will be more likely to produce an accurate prediction. This is useful in cases where the cold branches and the corresponding hot branch that map to the same state machine have severe contrary biases to their outcomes.

Figure 1:
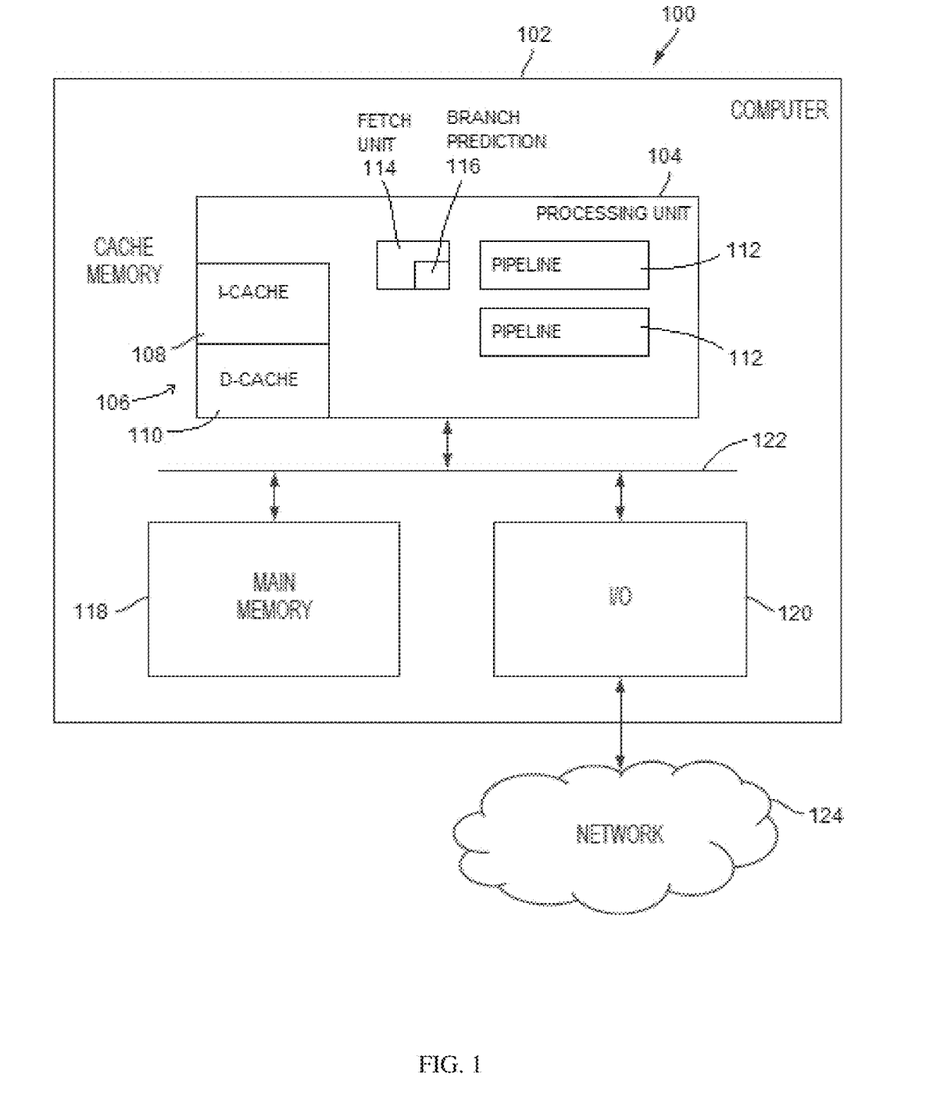
FIG. 1 is a block diagram illustrating a computer system according to one or more embodiments of the present invention.

FIG. 1 depicts an embodiment of a processing system 100 that is configured to perform aspects of embodiments described herein. The processing system 100 includes a computing device ("computer") 102 configured to execute instructions and perform branch prediction in accordance with embodiments described herein.

The computer 102 includes one or more processing units 104, which may be one or more processing cores. The processing unit 104 includes or is connected to a cache memory (or simply cache) 106, which may include an instruction cache 108 and a data cache 110. The cache 106 may include multiple cache levels (not depicted) that are on or off-chip from the processing unit 104.

The processing unit 104 includes hardware, units and logic for performing functions including fetching and executing instructions, prefetching instructions and data, and branch prediction as discussed in more detail below. For example, the processing unit 104 includes one or more pipelines 112. Each pipeline 112 includes a sequence of units or modules for executing instructions and performing other computing functions (e.g., memory access, communication, etc.). Each pipeline 112 is operably connected to a fetch unit 114 for fetching instructions and data, and a branch prediction unit 116.

The computer 102 also includes a memory 118, which may be accessed by the processing unit 104 for execution of instructions and/or for fetching data. The memory 118 may be a shared memory that is accessed by multiple processors and devices, such as a level-2 (L2) or level-3 (L3) cache. For example, the computer 102 can include multiple processing units 104, such as multiple processing cores, which share the memory 118 and other components of the computer 102. In one embodiment, the computer 102 is configured to support multithreading operations, such as simultaneous multithreading (SMT).

Other components that may be included in the system 100 include input/output (I/O) component(s) 120 in communication with the processing unit 104 via a bus 122. The I/O component(s) 120 may include one or more components that facilitate local and/or remote input/output operations to/from computer 102, such as a display, keyboard, modem, network adapter, etc. (not depicted).

In addition to the computer 102, the system 100 may include a network 124, which connects the computer 102 to additional systems (not depicted) and may include one or more wide area networks (WANs) and/or local area networks (LANs) such as the Internet, intranet(s), and/or wireless communication network(s). The computer 102 and additional system(s) are in communication via the network 124, e.g., to communicate data therebetween.

When a pipeline 112 fetches and executes an instruction stream or sequence (e.g., as a program or thread), a number of branch instructions may be encountered. A branch instruction, or simply a branch, is an instruction that causes the processing unit 104 to deviate from the default sequence of instructions to a different sequence of instructions. A branch instruction more often than not specifies a target address that specifies the location of the new instruction sequence. If the processing unit 104 programmatically executes the next instruction by retrieving the next instruction from the branch address, the branch instruction executed as a "not taken branch." If not, the branch instruction is a "taken branch."

The branch prediction unit 116 works in conjunction with the pipeline 112 to monitor branch instructions and predict whether a branch will be taken or not taken. The branch prediction unit 116 may include many digital circuits or tables that are used to attempt to guess which direction (i.e., taken or not taken) a branch will go before this is known definitively.

Many branch prediction techniques attempt to guess the direction of a branch instruction based on previous instances of the branch instruction. For example, a branch instruction that is always taken can be reliably predicted as a taken branch. Alternatively, a branch instruction that is often not taken can be predicted as a not taken branch. The aim of the branch prediction is to predict the outcome of branch instructions with as much accuracy as possible, to avoid a misprediction that can increase processing time.

State machines configured as n-bit counters are often used to predict a branch instruction direction based on the current state of the state machine. The current state of the state machine should be reflective of one or more previous outcomes of the branch instruction. As discussed further below, branch prediction techniques that utilize state machines produce predictions as to whether a branch will be taken or not taken based on the current state of the state machine.

It can be difficult to accurately predict the outcome of a branch prediction, as there often are branch instructions that occur with different frequencies. For example, there may be so-called "hot" branches that occur often. In addition, there may be branches that do not occur as often or only occur once. Such branches are referred to as "one-off" branches or "cold" branches. In some instances, there may be a number of such different branches that map to the same state machine, but are taken at different rates. For example, there may be one-off branches that occur between hot branches. As the state machine is updated based on the direction of previous branch instructions, one-off branches can cause the state machine to mispredict for subsequent hot branches.

In one embodiment, the system 100 is configured to address such difficulties by probabilistically gating updates to state machines in a branch predictor such as the branch prediction unit 116. The system 100 can thus counter pollution by one-off branches and cold branches by reducing mispredictions due to such one-off branches or cold branches, and thereby improve processing speeds and reduce latency.

For example, as discussed in more detail below, the branch prediction unit 116 is configured to consult a gating unit that stores a probability value and/or calculates a probability value. When the branch prediction unit 116 detects a branch instruction result from the execution unit, the branch prediction unit 116 determines whether the result matches the current state of the state machine and prior to performing an update to the state machine (as would conventionally follow), the branch prediction unit 116 gates the update by consulting the gating unit to determine whether the update should proceed or whether the current state should be maintained.

The gating unit may include a data structure such as a table that stores probability values. The gating unit also may be a circuit or algorithm that generates a probability value that is used by the branch prediction unit 116 to decide whether to perform a state machine update. Examples of the gating unit include a random number generator, a counter and/or a circuit or algorithm for calculating the probability value.

Figure 2:
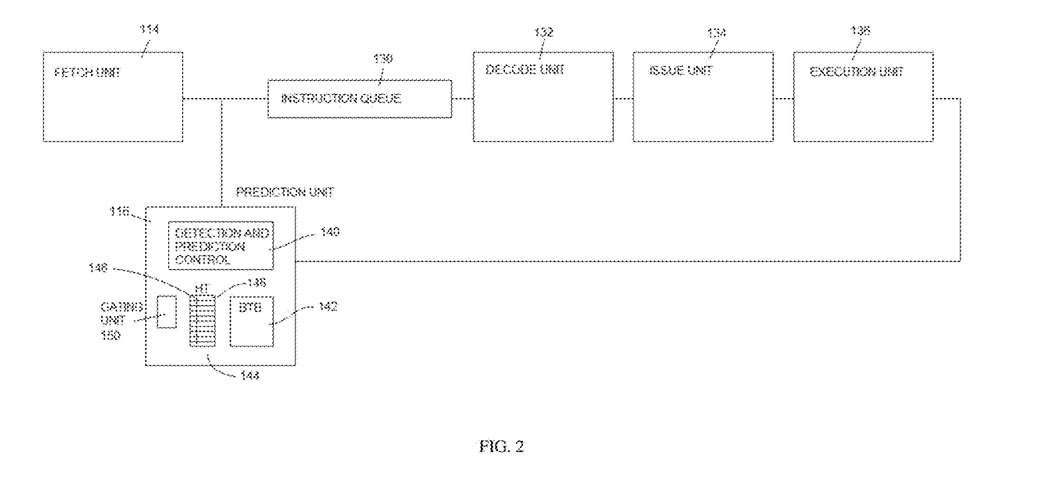
FIG. 2 is a block diagram illustrating a branch predictor according to one or more embodiments of the present invention.

FIG. 2 depicts an example of a branch prediction component that can be used to realize embodiments described herein. It is noted that branch prediction components can be configured in a variety of ways, thus the specific structures and configurations shown are not intended to be limiting.

The processing unit 104 includes the fetch unit 114 that retrieves instructions into an instruction queue 130 and into the pipeline 112. The pipeline 112 includes various components such as a decode unit 132, an issue unit 134 and an execution unit 136.

The decode unit 132 decodes instructions and passes the decoded instructions, portions of instructions, or other decoded data to the issue unit 134. The issue unit 134 analyzes the instructions or other data and transmits the decoded instructions, portions of instructions, or other data to the execution unit 136 to execute the instructions. The execution unit 136 may include a plurality of units, such as fixed-point execution units, floating-point execution units, load/store execution units, and vector execution units.

The branch prediction unit 116 includes prediction and detection control components 140 and one or more units or data structures that record previous branch instructions and characteristics relating thereto. For example, the prediction and control components 140 access a branch target buffer (BTB) 142, which stores information regarding previous branch instructions, such as target addresses and outcomes of branch instructions (i.e., whether a branch instruction was taken or not taken). Branch instruction information stored in the BTB 142 may be addressed by a subset of a branch address.

The branch prediction unit 116 may include a history table 144 that has a plurality of entries and may be incorporated into the branch prediction unit 116 in addition to or as an alternative to the BTB 142. Examples of the history table 144 include a Branch History Table (BHT) and a Pattern History Table (PHT). Each entry in the history table 144 includes a tag or index 146, such as a subset of a branch address. Although embodiments described herein have state machines in the history table 144, the state machines may instead be stored in the BTB 142, or in any other suitable location.

In one embodiment, each entry in the history table 144 includes a state machine 148, which may be an n-bit counter. The n-bit counter, in one embodiment, is a saturating counter. In one embodiment, each state machine 148 has a plurality of "taken" states and a plurality of "not taken" states. In one embodiment, the n-bit counter is a 2-bit counter having two taken states and two not taken states, however counters having other numbers of bits (e.g., a 3-bit or 4-bit counter) may be used. The n-bit counter at a given entry is used to attempt to learn the dominant behavior of a branch or multiple branches mapping to the same entry, and the current state of the n-bit counter is used to predict the direction (taken or not taken). Typically, there are many branch instructions in an instruction stream, such that the number of branch instructions can exceed the total number of entries. As a result, two or more branch instructions can map to the same entry.

The branch prediction unit 116 also includes one or more components, such as a counter, number generator, table, circuit or other, for gating updates to the entries to improve predictions. For example, the branch prediction unit 116 includes a gating unit 150.

Typically, when a branch predictor receives an outcome of a branch instruction, the corresponding state machine to which the branch instruction is mapped is updated. The branch prediction unit 116 detects the result of a branch instruction (whether the branch instruction was actually taken or not taken), and, prior to performing an update, consults the gating unit 150 to probabilistically decide whether to update the corresponding state machine. In one embodiment, the gating unit 150 includes a probability value that is based on a history of executions of branch instructions that map to a given state machine. In other cases, the probability value can be set statically. For example, the probability value is based on a number of branch instructions that were taken relative to the total number of branches mapped to the given state machine (or relative to the total number of branches in an instruction stream irrespective of whether the branches map to the given state machine). In this way, the prediction is improved by allowing the branch prediction unit 116 to avoid updating a state machine due to one-off or rarely taken branches.

Figure 3:
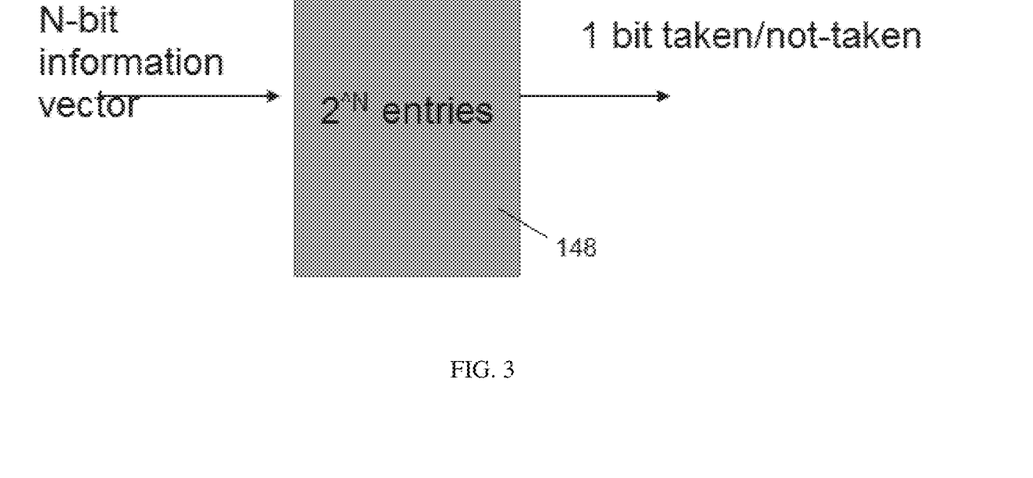
FIG. 3 depicts an example of a state machine used by a branch predictor to predict an outcome of a branch instruction.

FIG. 3 depicts aspects of a state machine that may be used as part of a branch prediction process. In one embodiment, a plurality of state machines 148 are arrayed as entries in the history table 144 or as entries in any other suitable table or other data structure. Each state machine 148 may be indexed by an information vector. The information vector has any suitable number N of bits, and includes information such as the branch address (typically represented by a subset of the branch address), execution history of branch instructions, branch type and/or others. Each state machine, in one embodiment, is an n-bit counter, which has $2^n$ states. For example, a 1-bit counter has two states, and a 2-bit counter has four states. In one embodiment, each state machine is a 2-bit counter.

The history table 144 has $2^N$ state machines in a given table, where the integer value of N may be selected based on considerations such as space, power restrictions and/or costs. For example, the history table 144 can include up to 32 state machines. As noted above, there may be a greater number of branch instructions than the number of entries in the history table 144. For example, a program may include up to 1024 statements and have a larger number of branch instructions than the 32 entries in the table.

Figure 4:
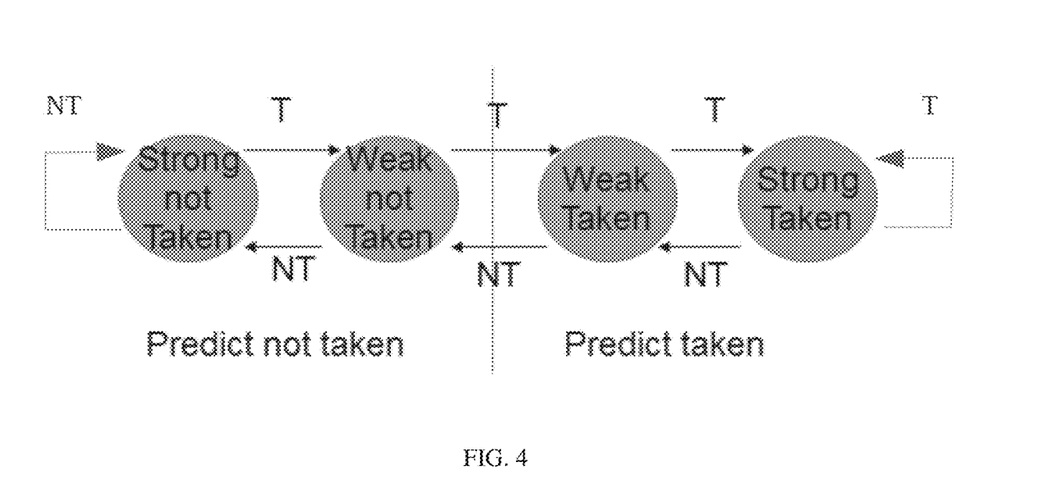
FIG. 4 depicts states of the state machine of FIG. 3.

FIG. 4 illustrates the states of a 2-bit counter. There are two not taken states, i.e., a "strong not taken" state and a "weak not taken" state. The strong not taken state corresponds to a value of 00, and the weak not taken state corresponds to a value of 01. There are also two taken states, i.e., a "strong taken" state and a "weak taken" state. The weak taken state corresponds to a value of 10, and the strong taken state corresponds to a value of 11. After a branch executes, a state transition can occur based on the outcome of the branch, i.e., whether the branch is actually taken or not taken.

As shown, an update to the 2-bit counter may result in a transition between states. After a branch instruction is processed, and the branch instruction is taken, the n-bit counter is incremented unless the entry is already in the strong taken state. If the branch instruction is not taken, the counter is decremented unless the counter is already at the strong not taken state. For example, if the branch instruction result is taken (T) and the counter is in the strong not taken state, incrementing the counter results in a transition from the strong not taken to the weak not taken state. If the branch instruction result is not taken (NT) and the counter is in a strong taken state, decrementing the counter results in a transition from the strong taken to the weak taken state.

In some instances, updating a state machine results in a transition between a taken state and a not taken state. For example, if the state machine is a 2-bit counter, a branch instruction result is taken (T) and the counter is in the weak not taken state, incrementing the counter results in a transition from a not taken to a taken state, i.e., from the weak not taken state to the weak taken state. If the branch instruction result is not taken (NT) and the counter is in the weak taken state, decrementing the counter results in a transition from the weak taken to the weak not taken state. Such a transition is referred to herein as a critical transition.

In one embodiment, the branch prediction unit 116 is configured to probabilistically gate an update to a state machine based on whether the update will result in a critical transition. For example, as shown in FIG. 2, the branch prediction unit 116 is configured to consult the gating unit 150, which stores a probability value or calculates a probability value. When the branch prediction unit 116 detects a branch instruction result, before updating a corresponding state machine, the branch prediction unit 116 may consult the probability value to determine whether the update should proceed or whether that state should stay the same.

In one embodiment, the gating unit 150 includes a random number generator configured to randomly or pseudo-randomly select a number from a preselected number range. The preselected number range may be based on a history of branch instruction results, such as the number of times that branch instructions mapped to the same state machine are taken or not taken.

In one embodiment, the preselected number range is selected based on a proportion or percentage of the number of times a taken branch occurs, relative to the total number of branch instructions either for the branches that are mapped to a state machine in a given sequence, or for the entire instruction stream. For example, the number range can be from 1 to 8, or any other range that corresponds to the proportion or percentage.

In one embodiment, the gating unit 150 includes a counter that increments or decrements for each execution of a branch instruction that was mapped to a given state machine. The counter has a preselected number range, with a maximum number based on the history of branch instruction results. For example, the counter can increment from zero to a selected maximum value, and the state machine is updated or gated when the counter reaches the maximum number. In another example, the counter can decrement from the maximum number, and the state machine is updated or gated when the counter reaches zero. The counter may be cleared after the maximum number is reached or the counter reaches zero.

In one embodiment, branch prediction unit 116 is configured to determine whether a state machine should be updated based on the history of branch instructions that map to a given state machine. For example, the probability value can be a proportion or percentage. The branch prediction unit 116 and/or the gating unit 150 can access the BTB 142 or other data structure to calculate a percentage of the total number of branch instructions mapped to a given state machine that were taken. If the calculated percentage matches a selected percentage or percentage range, the branch prediction unit 116 updates the entry. If not, the update is prevented. In another embodiment, the probability value can be an indication of a pattern of taken branches.

The probability value can change based on program or system behavior. For example, if the pattern and/or frequency of taken branches changes or is different than what was previously estimated, the probability value can be increased or decreased.

Figure 5:
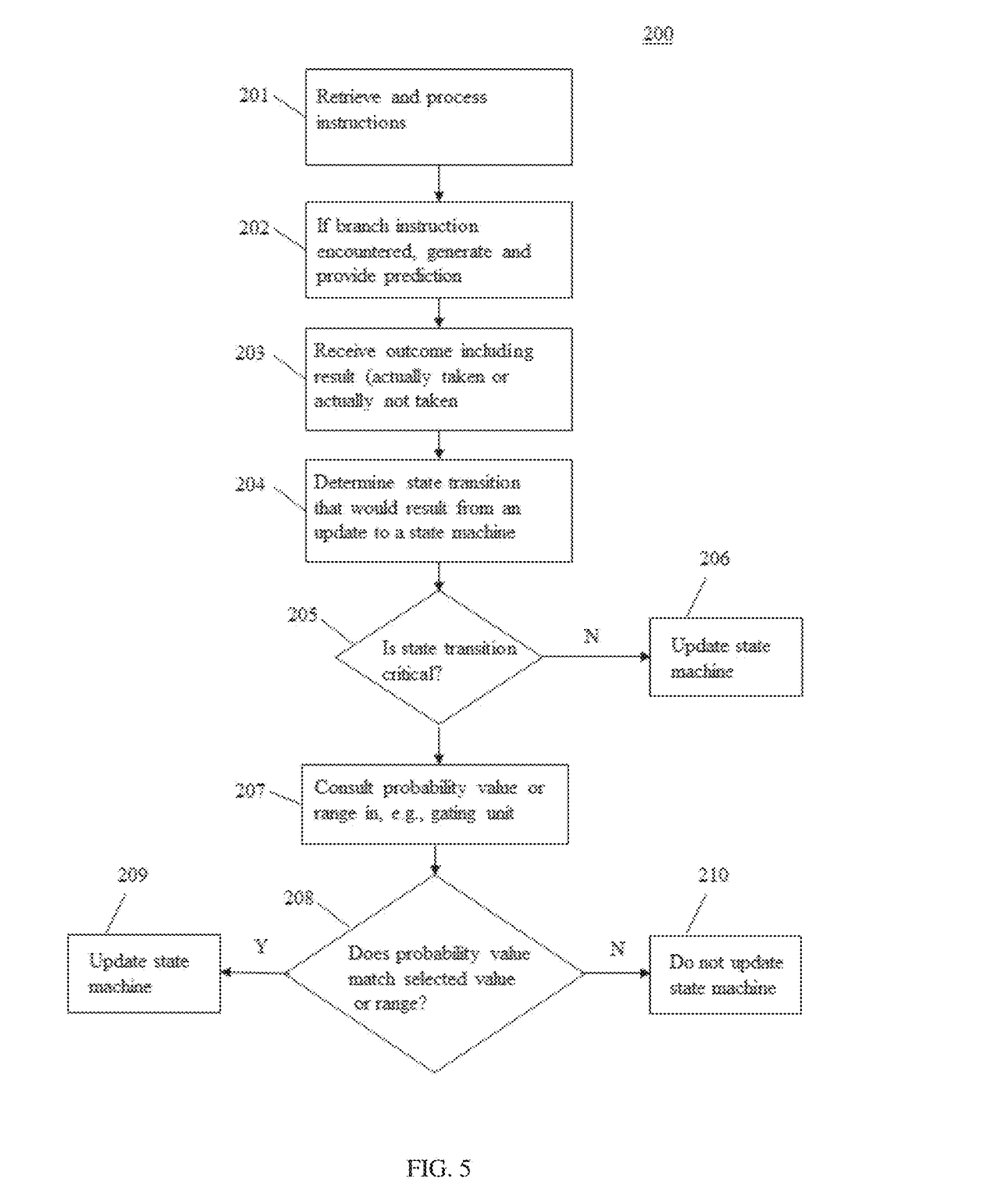
FIG. 5 is a flow chart depicting an embodiment of a method of branch prediction, according to one or more embodiments of the present invention.

FIG. 5 illustrates an embodiment of a method 200 of executing instructions and performing branch predictions. The method 200 may be performed by a processor OS, a branch predictor or other suitable application or program. Although the method 200 is discussed in conjunction with the system 100, the method 200 is not so limited. The method 200 is discussed in conjunction with blocks 201-210. The method 200 is not limited to the number or order of steps therein, as some steps represented by blocks 201-210 may be performed in a different order than that described below, or fewer than all of the steps may be performed.

At block 201, a processor such as the processing unit 104 and/or a pipeline 112 processes an instruction stream by retrieving instructions from an instruction cache via, e.g., the fetch unit 114. Each instruction in the instruction stream is processed in order.

At block 202, if at any stage of processing a branch instruction is encountered, a branch predictor such as the branch prediction unit 116 maps the branch instruction to a state machine, such as an n-bit counter configured as an entry in a history table. The branch prediction unit 116 then generates a prediction and provides the prediction to the processor. The prediction is based on the current state of the state machine, i.e., the state of the state machine after the most recent branch instruction (which mapped to the same state machine) has completed. For example, if the state machine is a 2-bit counter, and the current state of the state machine is "weak taken" or "strong taken," the branch prediction unit 116 provides a prediction of "taken" to the processing unit 104.

At block 203, the outcome of the branch instruction is returned to the branch prediction unit 116. The outcome includes a result of execution of the branch instruction by the processor, which is either that the branch instruction was taken by the processor or no taken by the processor. The result may be referred to herein as "actually taken" or "actually not taken."

At block 204, the branch prediction unit 116 determines a state transition that would occur if the state machine is updated. Updates may be performed if there is a misprediction, i.e., the prediction is not consistent with the result. Updates may also be performed if the prediction is consistent with the result and the prediction is a weak prediction. A weak prediction is a prediction based on the state machine when the state machine is in a weak state (e.g., weak taken or weak not taken).

For example, in a 2-bit state machine, if the result is "taken" and the current state is strong taken, then no update is needed. If the result is "not taken" and the current state is strong taken, the update would involve changing the state from strong taken to weak taken. In another example, if the result is "taken" and the current state is weak taken, the state machine would be updated from weak taken to strong taken.

At block 205, the branch prediction unit 116 determines whether the transition is a critical transition from a taken state to a not taken state. For example, if the update would involve incrementing the 2-bit counter from weak not taken to weak taken, or decrementing the 2-bit counter from weak taken to weak not taken, a critical state transition is identified.

At block 206, if the transition that would occur due to the update is not a critical transition, the state machine is updated. The method 200 then repeats for the next instruction.

At block 207, if the transition is a critical transition, the branch prediction unit 116 consults a probability value (a single value or range of values) that is stored in or calculated by, e.g., the gating unit 150. The branch prediction unit 116 compares the probability value to a preselected value (or a selected range of values). In one embodiment, the probability value is provided by a random number generator, which randomly or pseudo-randomly outputs a number from a selected range of numbers (e.g., 1 to 8). The preselected value is one of the possible numbers that can be outputted (e.g., 1).

At block 208, the branch prediction unit 116 compares the probability value or range to the selected value or range. For example, if the probability value is a number outputted by the random number generator, the branch prediction unit 116 compares the output number to the selected number to determine whether there is a match.

In other embodiments, the probability value is a selected percentage or proportional value, and the branch prediction unit determines whether there is a match based on information regarding the history of executions of branch instructions that mapped to the state machine. For example, the probability value is a selected percentage, and the branch instruction unit 116 calculates the percentage of the total number of branch instructions that were actually taken. A match is found if the calculated percentage matches the selected percentage, i.e., if the calculated percentage is the same as the selected percentage or within some range of the selected percentage If a match is found, the branch prediction unit 116 updates the state machine (block 209). If a match is not found, the branch prediction unit 116 does not update the state machine. The method 200 then repeats for the next instruction in the instruction sequence.

The following example illustrates some advantages of the embodiments described herein. In this example, there are three branch instructions, denoted as A, B, and C, which map to the same state machine. The following sequence shows how the branch instructions occur in an instruction stream, where the leftmost branch occurrence is the earliest and the rightmost occurrence is the latest:

A A A A A A B C A A A A A A A A A B C A.

As shown, branch A occurs very frequently, and is referred to as a "hot branch." Branches B and C occur relatively infrequently, and are referred to as "cold branches" or "one-off branches." In this example, branch A has always been taken, and branches B and C have always been not taken.

In a typical branch prediction process, without gating as discussed herein, the above sequence results in six mispredictions. By probabilistically gating updates to the state machine, the number of mispredictions is four. The embodiments described herein are thus able to reduce the number of mispredictions without requiring extra hardware or components that could affect processing times. In addition, even with the inclusion of components such as the gating unit 150, a counter and/or a random number generator, processing time is not significantly affected.

Figure 6:
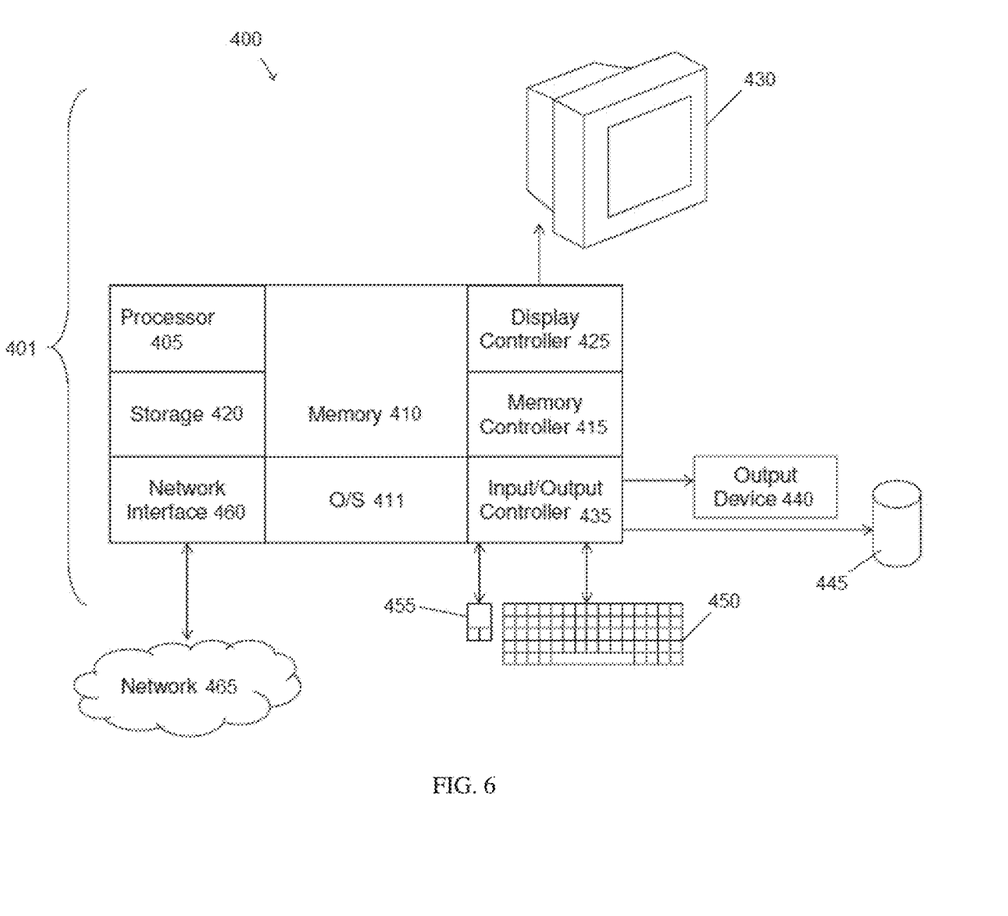
FIG. 6 is a block diagram that depicts an embodiment of a computing system that can perform methods according to one or more embodiments of the present invention.

FIG. 6 depicts a block diagram of a system 400 for performing the methods described herein. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 400, therefore, includes a computer 401 as illustrated in FIG. 6.

In an exemplary embodiment, in terms of hardware architecture, as shown in FIG. 6, the computer 401 includes processor 405 (e.g., the processing unit 104 or core of FIG. 1). The computer 401 further includes memory 410 (e.g., main memory) coupled to a memory controller 415, and one or more input and/or output (I/O) devices 440, 445 (or peripherals) that are communicatively coupled via a local input/output controller 435. The input/output controller 435 can be, for example, but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 6, the instructions in the memory 410 can include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465.

When the computer 401 is in operation, the processor 405 is configured to fetch and execute instructions stored within the memory 410, to communicate data to and from the memory 410, and to generally control operations of the computer 401 pursuant to the instructions.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for predicting an outcome of a branch instruction, the computer system comprising:
   a memory;
   a processor operatively connected to the memory, the processor including a processing unit and a branch predictor, the processor configured to perform:
      identifying an instruction retrieved from an instruction sequence by the processing unit;
      based on the instruction being a branch instruction, generating a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction;
      returning the prediction to the processing unit;
      detecting an outcome of the branch instruction from the processing unit, the outcome including a result that the branch instruction was actually taken or actually not taken;
      based on the prediction being different than the result, or based on the prediction being weak and consistent with the result, consulting a probability value, the probability value being at least one of a static value and a value based on a history of outcomes of previous branch instructions, wherein the probability value includes a percentage or proportion value, and the branch predictor is configured to determine whether the state machine is to be updated based on the percentage or proportion value; and
      based on the probability value having a selected value or being within a selected range, updating the state machine.

2. The computer system of claim 1, wherein the state machine has a plurality of taken states and a plurality of not taken states, and consulting the probability value is performed based on determining that the update will cause a critical state transition, the critical state transition being a change between a taken state and a not taken state.

3. The computer system of claim 2, wherein the state machine is a 2-bit counter, the plurality of not taken states includes a strong not taken state and a weak not taken state, the plurality of taken states includes a strong taken state and a weak taken state, and the critical state transition is between the weak not taken state and the weak taken state.

4. The computer system of claim 1, where the percentage or proportion value is based on at least one of:
    a statically set value;
    a percentage or proportion of a total number of branch instructions mapped to the state machine that were taken;
    a percentage or proportion of the total number of branch instructions mapped to the state machine that were not taken;
    a percentage or proportion of the total number of branch instructions in the instruction sequence that were taken; and
    a percentage or proportion of the total number of branch instructions in the instruction sequence that were not taken.

5. The computer system of claim 1, wherein the probability value is a number configured to be output by a random number generator.

6. The computer system of claim 5, wherein the random number generator is configured to output the number from a number range, the number range preselected as a static number range or preselected based on a number of times that previous branch instructions were taken, and the state machine is updated based on the output number matching a selected number from the number range.

7. The computer system of claim 1, wherein the probability value is a number configured to be output by a counter, the counter having a preselected number range, the counter configured to be incremented or decremented for each executed branch instruction mapped to the state machine, or remain statically set to a preselected value.

8. A method of predicting an outcome of a branch instruction, the method comprising:
    identifying, by a branch predictor, an instruction retrieved from an instruction sequence by a processing unit;
    based on the instruction being a branch instruction, generating a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction;
    returning the prediction to the processing unit;
    detecting an outcome of the branch instruction from the processing unit, the outcome including a result that the branch instruction was actually taken or actually not taken;
    based on the prediction being different than the result, or based on the prediction being weak and consistent with the result, consulting a probability value, the probability value being at least one of a static value and a value based on a history of outcomes of previous branch instructions, wherein the probability value includes a percentage or proportion value, and the branch predictor is configured to determine whether the state machine is to be updated based on the percentage or proportion value; and
    based on the percentage or proportion value having a selected value or being within a selected range, updating the state machine.

9. The method of claim 8, wherein the state machine has a plurality of taken states and a plurality of not taken states, and consulting the probability value is performed based on determining that the update will cause a critical state transition, the critical state transition being a change between a taken state and a not taken state.

10. The method of claim 9, wherein the state machine is a 2-bit counter, the plurality of not taken states includes a strong not taken state and a weak not taken state, the plurality of taken states includes a strong taken state and a weak taken state, and the critical state transition is between the weak not taken state and the weak taken state.

11. The method of claim 8, wherein the percentage or proportion value is based on at least one of:
    a statically set value;
    a percentage or proportion of a total number of branch instructions mapped to the state machine that were taken;
    a percentage or proportion of the total number of branch instructions mapped to the state machine that were not taken;
    a percentage or proportion of the total number of branch instructions in the instruction sequence that were taken; and
    a percentage or proportion of the total number of branch instructions in the instruction sequence that were not taken.

12. The method of claim 8, wherein the probability value is a number configured to be output by a random number generator.

13. The method of claim 12, wherein the random number generator is configured to output the number from a number range, the number range preselected as a static number range or preselected based on a number of times that previous branch instructions were taken, and the state machine is updated based on the output number matching a selected number from the number range.

14. The method of claim 8, wherein the probability value is a number configured to be output by a counter, the counter having a preselected number range, the counter configured to be incremented or decremented for each executed branch instruction mapped to the state machine, or remain statically set to a preselected value.

15. A computer program product comprising a computer readable storage medium having program instructions embodied therewith, the program instructions executable by a processing system to perform:
    identifying, by a branch predictor, an instruction retrieved from an instruction sequence by a processing unit;
    based on the instruction being a branch instruction, generating a prediction by the branch predictor that the branch instruction will be taken or not taken by consulting a current state of a state machine, the state machine having at least one taken state and at least one not taken state, the state machine configured to be updated based on whether the branch instruction is actually taken or actually not taken by the processing unit when the processing unit executes that branch instruction;
    returning the prediction to the processing unit;

detecting an outcome of the branch instruction from the processing unit, the outcome including a result that the branch instruction was actually taken or actually not taken;

based on the prediction being different than the result, or based on the prediction being weak and consistent with the result, consulting a probability value, the probability value being at least one of a static value and a value based on a history of outcomes of previous branch instructions, wherein the probability value includes a percentage or proportion value, and the branch predictor is configured to determine whether the state machine is to be updated based on the percentage or proportion value; and based on the percentage or proportion value having a selected value or being within a selected range, updating the state machine.

16. The computer program product of claim 15, wherein the state machine has a plurality of taken states and a plurality of not taken states, and consulting the probability value is performed based on determining that the update will cause a critical state transition, the critical state transition being a change between a taken state and a not taken state.

17. The computer program product of claim 15, wherein the percentage or proportion value is based on at least one of:

a statically set value;

a percentage or proportion of a total number of branch instructions mapped to the state machine that were taken;

a percentage or proportion of the total number of branch instructions mapped to the state machine that were not taken;

a percentage or proportion of the total number of branch instructions in the instruction sequence that were taken; and a percentage or proportion of the total number of branch instructions in the instruction sequence that were not taken.

18. The computer program product of claim 15, wherein the probability value is a number configured to be output by a random number generator, the random number generator configured to output the number from a number range, the number range preselected as a static number range or preselected based on a number of times that previous branch instructions were taken, and the state machine is updated based on the output number matching a selected number from the number range.

19. The computer program product of claim 15, wherein the probability value is a number configured to be output by a counter, the counter having a preselected number range, the counter configured to be incremented or decremented for each executed branch instruction mapped to the state machine or remain statically set to a preselected value.

* * * * *